US008681519B2

(12) United States Patent
Phadke (10) Patent No.: US 8,681,519 B2
(45) Date of Patent: *Mar. 25, 2014

(54) VARIABLE INPUT VOLTAGE PFC CIRCUITS, SYSTEMS AND POWER SUPPLIES WITH PHASE SHIFTED POWER RAILS

(75) Inventor: Vijay G. Phadke, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 452 days.

This patent is subject to a terminal disclaimer.

(21) Appl. No.: 13/041,018

(22) Filed: Mar. 4, 2011

(65) Prior Publication Data

US 2012/0224401 A1  Sep. 6, 2012

(51) Int. Cl.
*G05F 1/445* (2006.01)

(52) U.S. Cl.
USPC ............................................ 363/89; 323/272

(58) Field of Classification Search
USPC ...................... 323/207, 222, 272; 363/65, 89
See application file for complete search history.

(56) References Cited

U.S. PATENT DOCUMENTS

| 7,023,716 | B1* | 4/2006 | Wu ................................. 363/89 |
| 8,098,505 | B1* | 1/2012 | Choi .............................. 363/89 |
| 8,248,040 | B2* | 8/2012 | Rausch et al. ................ 323/207 |
| 8,324,871 | B2* | 12/2012 | Tsai et al. ..................... 323/207 |
| 8,373,399 | B2* | 2/2013 | Yang et al. .................... 323/272 |
| 8,441,822 | B2* | 5/2013 | de Groot et al. ............... 363/89 |
| 8,456,139 | B2* | 6/2013 | Phadke ......................... 323/222 |
| 8,476,879 | B2* | 7/2013 | Gaboury et al. .............. 323/272 |
| 2012/0224401 | A1* | 9/2012 | Phadke ............................ 363/84 |

* cited by examiner

*Primary Examiner* — Jeffrey Sterrett
(74) *Attorney, Agent, or Firm* — Harness, Dickey & Pierce, P.L.C.

(57) ABSTRACT

A method of generating an output voltage from a variable input voltage with a power factor correction (PFC) system is disclosed. The PFC system includes a first power rail and a second power rail connected in parallel between an input for receiving the input voltage and an output for outputting the output voltage. The method includes operating one or both of the first power rail and the second power rail to generate the output based, at least in part, on whether the input voltage exceeds a threshold voltage. Power supplies and PFC systems suitable for performing the method are also disclosed.

18 Claims, 5 Drawing Sheets

VARIABLE INPUT VOLTAGE PFC CIRCUITS, SYSTEMS AND POWER SUPPLIES WITH PHASE SHIFTED POWER RAILS

FIELD

The present disclosure relates to the field of power supplies and power factor correction. In particular, this disclosure relates to power factor correction operable with two different input voltages.

BACKGROUND

This section provides background information related to the present disclosure which is not necessarily prior art.

Some low power and medium power server power supplies are designed for wide range AC input voltages ranging from 90V AC to 265V AC, for 120V and 230V utility lines. However, some data center applications are designed mainly for high line operations where the efficiency and power factor performances at high line AC inputs need to be maximum. Furthermore, data center applications demand high efficiency with high power factor at light load conditions (approx. 10% to 50% load).

In prior art PFC systems, the overall efficiency of the systems is compromised to enable the front end power factor correction boost converter systems to operate at two widely separated input AC voltages (i.e. low line and high line).

Figure 1:
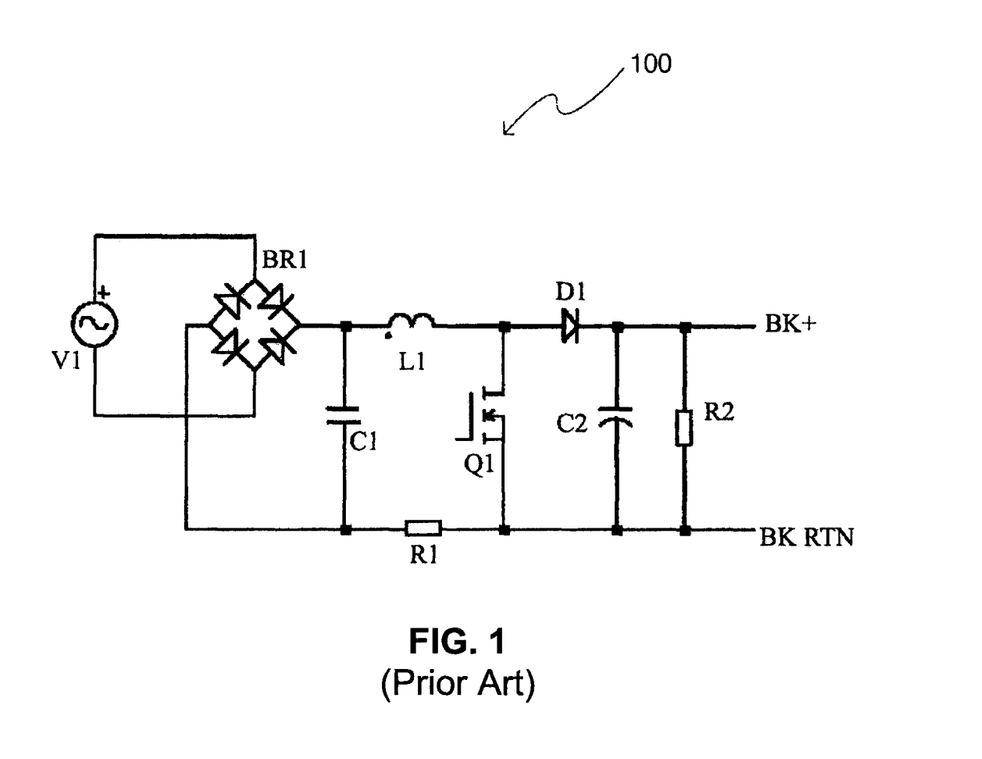
FIG. 1 is a circuit diagram of a prior art power factor correcting boost converter with a single power rail operating at two widely separated AC input voltages.

A prior art power factor correcting boost converter system 100 with a single power rail operating at two widely separated AC input voltages is illustrated in FIG. 1. The design requirements of a boost inductor L1, a switch Q1 and a boost diode D1 are different when operating at two widely separated AC input voltages. However, since there is a single power rail, the system works at a compromised efficiency.

Various techniques have been used to improve the power factor of a power supply.

SUMMARY

This section provides a general summary of the disclosure, and is not a comprehensive disclosure of its full scope or all of its features.

According to one aspect of the present disclosure a power factor correction system (PFC) for generating an output voltage from an input voltage includes an input for receiving the input voltage, an output for outputting the output voltage, a first power rail coupled to the input and the output to receive the input voltage and generate the output voltage, a second power rail selectively operable to generate the output voltage coupled to the input and the output, and a controller coupled to the input. The first power rail includes a first switch and a first inductor having a first inductance value. The second power rail includes a second switch and a second inductor having a second inductance value. The controller is configured to detect a magnitude of the input voltage, to generate a first control signal to control switching of the first switch, to generate a second control signal to control switching of the second switch when the magnitude of the input voltage is less than or equal to a nonzero threshold value, and to not generate the second control signal when the magnitude of the input voltage exceeds the threshold voltage.

According to another aspect of the present disclosure, a power factor correction system (PFC) for generating an output voltage from an input voltage includes an input for receiving the input voltage, an output for outputting the output voltage, a first power rail coupled to the input and the output to receive the input voltage and generate the output voltage, a second power rail coupled to the input and the output, and a controller coupled to the input. The first power rail includes a first switch and a first inductor. The second power rail is selectively operable to generate the output voltage and includes a second switch and a second inductor. The controller is configured to detect a magnitude of the input voltage, to operate the first power rail to produce the output voltage, to operate the second power rail to produce the output voltage when the magnitude of the input voltage is less than or equal to a nonzero threshold value, to operate the first power rail and the second power rail with a phase difference between them of greater than zero degrees when the magnitude of the input voltage is less than or equal to the threshold value, and to not operate the second power rail when the magnitude of the input voltage exceeds the threshold voltage.

According to yet another aspect of the present disclosure, a method of generating an output voltage from an input voltage with a power factor correction system (PFC) including a first power rail, a second power rail, and a controller is disclosed. The first and second power rails are coupled between an input and an output to receive the input voltage and generate the output voltage. The controller is configured to selectively operate the first and second power rails to generate the output voltage. The method includes operating the first power rail to produce the output voltage, operating the second power rail with a phase difference relative to the first power rail greater than zero degrees to produce the output voltage when a magnitude of the input voltage is less than or equal to a nonzero threshold value, and not operating the second power rail when the magnitude of the input voltage exceeds the threshold voltage.

Some example embodiments of power supplies, power factor correction circuits, etc. incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes of selected embodiments only and are not intended to limit the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

According to one aspect of the present disclosure, a method of generating an output voltage from a input voltage with a power factor correction system (PFC) having a first power rail and a second power rail connected in parallel between an input for receiving the input voltage and an output for outputting the output voltage is disclosed. The method includes operating one or both of the first power rail and the second power rail to generate the output based, at least in part, on whether the input voltage exceeds a threshold voltage.

According to another aspect of this disclosure, a power factor correction (PFC) circuit includes an input to receive one of a first voltage and a second voltage. The first voltage has a magnitude larger than the second voltage. The PFC circuit includes an output for providing a direct current (DC) output. A first power rail is coupled between the input and the output. The first power rail is adapted to convert the first voltage to the DC output. A second power rail is coupled between the input and the output. The second power rail is adapted to convert the second voltage to the DC output. The PFC circuit is configured to operate the first power rail when the first voltage is coupled to the input and to operate the first and second power rails when the second voltage is coupled to the input.

The first voltage and the second voltage may be any suitable voltages. The first and second voltages may be DC input voltages or AC input voltages. If the first and second voltages are AC input voltages, the first and second voltages may be rectified to DC input voltages by any appropriate rectifier. The first voltage may be, for example, a 230 volt AC input voltage and the second voltage may be a 115 volt AC input voltage.

The first power rail may be a first boost converter and the second power rail may be a second boost converter. The first boost converter includes a first boost inductor and the second boost converter includes a second boost inductor.

The first and second boost inductors may have the same inductance. When the first and second boost inductors have about the same inductance, the first power rail and the second power rail will each handle approximately the same amount of current when the input is the second voltage.

Alternatively, the first boost inductor may have a different inductance than the second boost inductor. The second boost inductor may have less inductance than the first boost inductor. Accordingly, the second power rail will carry more current than the first power rail when the input is the second voltage. In at least one embodiment, the second boost inductor has about half the inductance of the first boost inductor. In such an embodiment, the second power rail will carry about two-thirds of the total current of the PFC circuit, while the first power rail will carry about one-third of the total current.

Without limiting the aspects and/or embodiments discussed above, further embodiments of the present disclosure, which may or may not include one or more aspects discussed above, will be discussed hereinafter.

The present disclosure envisages a cost effective solution for delivering the same level of power at both low line and high line input voltages with high efficiency and power factor for all load conditions.

Figure 2:
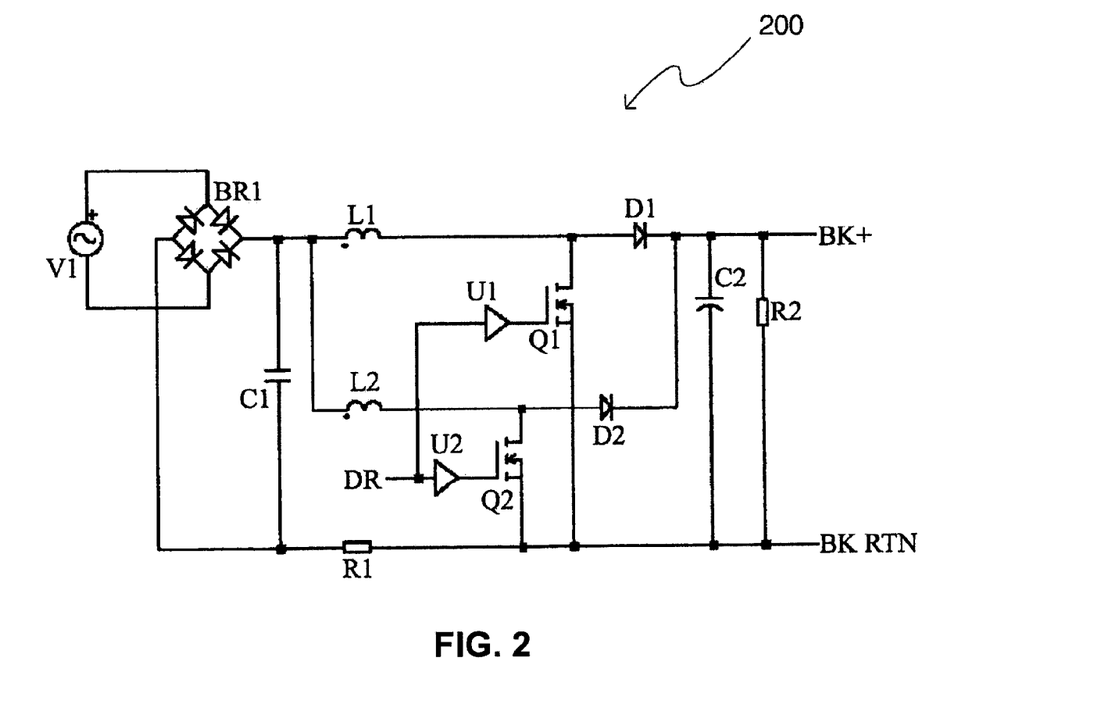
FIG. 2 is a circuit diagram of a power factor correcting boost converter according to one example embodiment of the present disclosure.

FIG. 2 illustrates a power factor correcting boost converter system in accordance with the present disclosure and is indicated generally by numeral 200. The system 200 illustrates a power converter operating on two power rails, one power rail being a high line (230V AC) and the other being a low line (120V AC). Two boost inductors L1 and L2, two semiconductor power switches Q1 and Q2 and two boost diodes D1 and D2 are provided, one for each power rail.

The two power rails may be the same as each other or different from each other. When the two power rails are different from each other, at least one component of one of the power rails differs from a similar component in the other power rail. In such embodiments, one rail will carry more current than the other rail at times when both rails are operating. When designed to be the same, the components in each power rail are generally the same and have the same nominal component values (e.g., inductance, resistance, etc.). In such embodiments, both power rails will carry about the same amount of current at times when both rails are operating.

In at least one embodiment, the power rails are not identical. The boost inductors L1 and L2 are different. The inductors L1 and L2 may have different design criteria, wire size, number of turns and/or inductance values. The boost inductors L1 and L2 may or may not use identically sized magnetic cores. It is also possible to use different core materials for the two boost inductors L1 and L2. The inductance value of the boost inductor L1 may be greater than that of the boost inductor L2.

The switches Q1 and Q2 and the diodes D1 and D2 may also have different specifications, if required. The current ratings of the switch Q2 and the boost diode D2 in the low line power rail may be greater than that of the switch Q1 and the boost diode D1 to handle higher peak and RMS currents at low line voltage. The rating of a device typically refers to the limiting values of operating conditions outside which the device could be damaged. For instance, typical ratings of a diode include the peak inverse voltage (PIV) or the maximum voltage that a diode can withstand in the reverse direction without breaking down, maximum repetitive reverse voltage (Vrrm) or the maximum amount of voltage the diode can withstand in reverse-bias mode, in repeated pulses and the like. Again, the ratings of a semiconductor switch typically include the current rating or the maximum current the switch is designed to carry and the voltage rating or the maximum voltage allowable in the circuit in which the switch is used.

The system 200 is described herein below, wherein the boost inductor L1, the switch Q1 and the diode D1 are first designed for the high line power rail without any consideration to low line conditions while the boost inductor L2, the switch Q2 and the diode D2 are designed for the low line power rail such that they handle approximately two thirds of the power at low line. V1 represents an input AC supply with voltage ranging from 90V AC to 265V AC. BR1 represents a diode bridge rectifier for the conversion of the input alternating current (AC) into direct current (DC) output.

In order to control the current flowing to a load R2, a controller represented by DR is provided to control the duty cycle of the switches Q1 and Q2. A current sensing resistor R1 is coupled in series with the source terminal of the switches Q1 and Q2 and the voltage across the resistor R1 provides the necessary signal to the controller DR so that the duty cycle of switches Q1 and Q2 can be controlled and as a result the power factor can be suitably corrected. The resistor R1 is referenced to a bulk negative return power rail BK RTN. The controller DR uses the same reference BK RTN. BK+ represents a bulk positive power rail of the system.

U1 and U2 are gate drivers for the switches Q1 and Q2 respectively. The gate drivers U1 and U2 accept an input from the controller DR and produce an appropriate low impedance gate drive for the switches Q1 and Q2 respectively. An input AC supply detection circuit (not shown) senses the input line voltage to determine whether it is a high line or low line voltage. The output of the gate driver U2 is disabled at high line voltage and enabled at low line voltage depending on the sensed input voltage. The system in accordance with the present disclosure generates an output for either the high line or the low line voltage. It is not possible for both the input voltages to coexist at the same time.

At high line voltage, only the associated power rail of the boost PFC including the boost inductor L1, the switch Q1, the gate drive U1 and the boost diode D1 operate while the low line power rail is disabled. The design of the high line power rail is independent of the low line operation. Thus the components in the high line power rail are designed for full power (the maximum power that the system can generate). At high line voltage, the input current is much lower than at low line voltage. As a result, the copper losses in the inductor L1 as well as the conduction losses of the boost switch Q1 are negligible but core losses become significant. As the design of the high line power rail focuses only on high line voltage with no regard to low line input currents, inductor L1 with relatively thinner wires and higher number of turns are used. This reduces flux density and high inductance can be achieved. Since the conduction losses decrease in proportion to the square of the current, they become insignificant at lighter loads (approx. 10% to 50% load). The inductance of inductor L1 is selected such that the system remains in continuous conduction mode and the power factor is improved at light load conditions. Thus, maximum possible efficiency at desired high line voltage and load conditions is achieved. However, the design must make sure that the thermal requirements are met at full load and light load condition for the high line input voltage and the ambient temperature.

At low line voltage, both the power rails are enabled and operate simultaneously. However, because the power rails are not the same, the power handled by the power rails is unequal. The power rail for low line voltage is designed only for about two-thirds of the full power. The power rails are adapted to deliver power at the low line voltage in a manner that the ratio of power handled by the high line power rail to the low line power rail is approximately equal to the ratio of the low line voltage to the high line voltage. The ratio of the values of inductances of the boost inductors L1 and L2 in the high line power rail and the low line power rail respectively are proportional to the power sharing requirement ratio of the power rails. It is ensured that the inductance of the boost inductor L2 in the low line power rail is approximately one half of the inductance of the boost inductor L1 in the high line power rail at full load, the current carrying capacity of the switch Q1 in the high line power rail is approximately half the current carrying capacity of the switch Q2 in the low line power rail and the peak and RMS current capacity of the diode D1 in the high line power rail is approximately half of the peak and RMS current capacity of the diode D2 in the low line power rail. The ratio of the value of L1 and L2 ensures that when the switches Q1 and Q2 are both switched simultaneously, the boost inductor L1 handles only about one third of the voltage. This technique makes sure that the thermal behavior and management for the high line power rail remains the same at both the widely separated AC input voltages. The boost inductor L2 in the low line power rail is smaller in inductance and it uses relatively thicker wires to manage the relatively higher current flowing through it.

Figure 3:
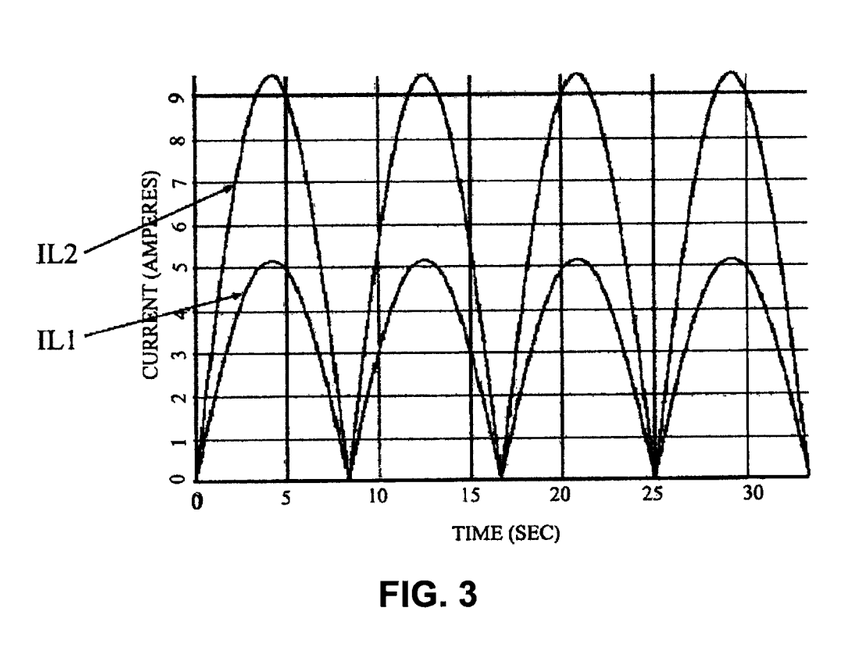
FIG. 3 is a graph of current (in amperes) through the boost inductors versus time (in seconds) of the power factor correcting circuit of FIG. 2 operating at a low line voltage.

FIG. 3 illustrates a graph of current (in amperes) through the boost inductors versus time (in seconds) of a power factor correcting circuit of FIG. 2 operating at low line voltage. IL2 represents the current through the inductor L2 and IL1 represents the current through the inductor L1 when both the power rails are enabled at low line voltage. It is clearly evident from the graphs that the inductor L2 delivers about two thirds of the total current where as the inductor L1 delivers about one third of the total current.

The current flowing through the current sensing resistor R1 is the sum of the currents flowing through the boost inductors L1 and L2. Thus the control circuit DR receives the sensed current signal from R1 and operates without knowing that there is unequal power sharing between the two power rails.

At low line voltage, the capacitive switching losses will be relatively higher due to the higher number of switching devices, since both the power rails are enabled at low line voltage. Devices with relatively higher current carrying capacity are necessary for handling the line current at low line voltage. However, the power devices in the low line power rail and core losses of the low line boost inductor are absent at high line operation. As discussed above, power rails may also be the same such that they share the power equally at low line voltage, one of them being disabled at high line voltage. This may offer improved efficiency and power factor performance at high line voltage as compared to prior art systems. At low line voltage, each power rail will handle about one-half of the total current in the PFC system.

Figure 4:
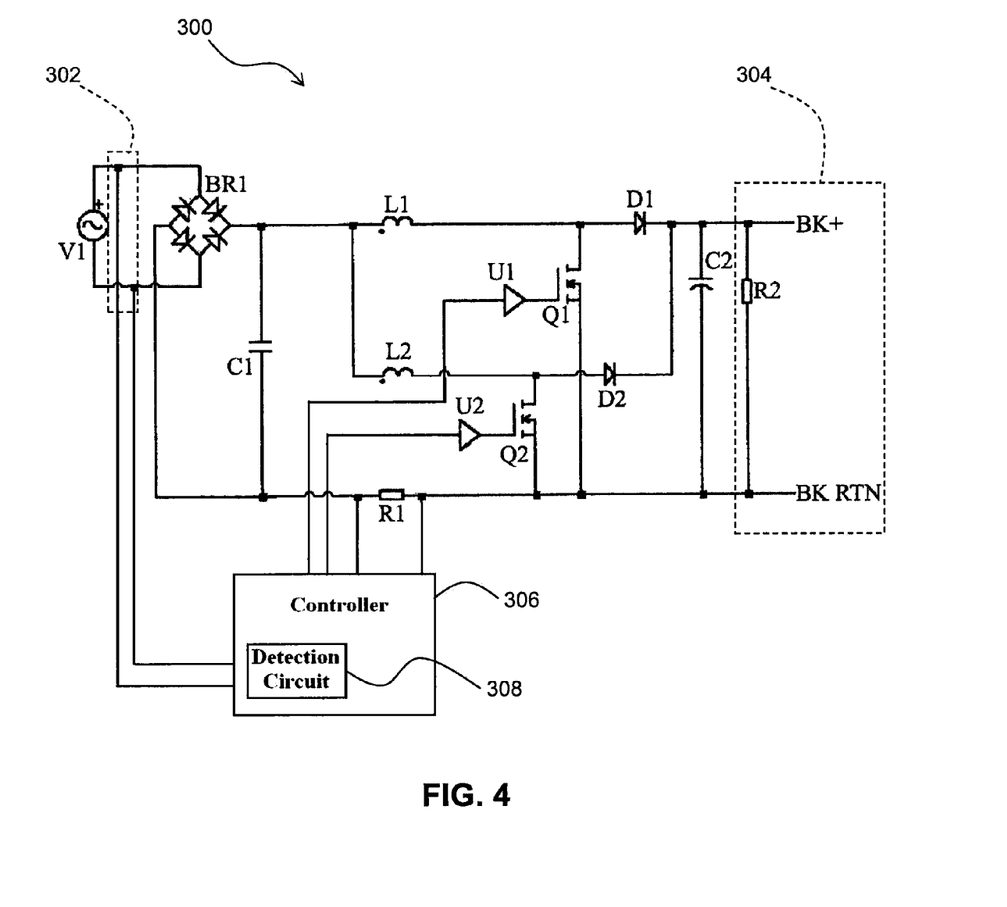
FIG. 4 is a circuit diagram of another example power factor correction system including two power rails and a controller for providing control signals to the two power rails.

Another example embodiment of a power factor correction (PFC) system 300 is shown in FIG. 4. The PFC system 300 includes an input 302 for receiving an input voltage and an output 304 for outputting an output voltage. The system includes a first power rail coupled to the input 302 and the output 304 to receive the input voltage and generate the output voltage. The first power rail includes an inductor L1 having a first inductance value. The system includes a second power rail coupled to the input and the output. The second power rail is selectively operable in conjunction with the first power rail to generate the output voltage. The second power rail includes an inductor L2 having a second inductance value. The system includes a controller 306 configured to enable the second power rail to generate the output voltage when a magnitude of the input voltage is less than or equal to a threshold value, and to disable the second power rail when the magnitude of the input voltage exceeds a threshold voltage.

When the PFC system 300 is operating to provide the output voltage, the first power rail is operating to receive the input voltage and output the output voltage. The second power rail, however, is only operated when the magnitude of the input voltage is less than or equal to a threshold value. The threshold value may be a value between two different expected input voltages. For example, the expected input voltages may be 115 volts AC and 230 volts AC. In that event, the threshold voltage may be, for example, about 160 volts AC. The PFC system may include hysteresis to reduce or prevent oscillations from occurring. Thus, the threshold voltage may differ when only the first power rail is operating and when both the first and second power rails are operating. If, for example, the expected input voltages are 115 volts AC and 230 volts AC, the threshold voltage to turn off (i.e., not operate) the second power rail may be 160 volts AC, while the threshold to turn on (i.e., operate) the second power rail when the first power rail is already operating may be about 150 volts AC.

Controller 306 is configured to generate a first control signal to control a switch Q1 of the first power rail to produce the output voltage. When the input voltage is less than or equal to the threshold voltage, the controller 306 generates a second control signal to control a switch Q2 of the second power rail to produce the output voltage.

A signal representing the output current of the PFC system 300 is received by the controller 306 from resistor R1 and used to determine how to operate the switches Q1, Q2. Any appropriate control scheme may be used, including, for example, continuous current mode, discontinuous current mode, boundary mode, etc. The output current signal represents the total output current of the PFC system 300. Thus, the controller 306 may provide the control signal without regard for, and possibly without knowledge of, whether the second power rail is operating or disabled.

The detection circuit discussed above is shown coupled to the input 302 to detect the magnitude of the input voltage in FIG. 4. The detection circuit 308 is illustrated in this example as part of the controller 306, but may instead be separate from the controller 306. The detection circuit 308 is coupled to the AC input voltage V1 and is, thus, an AC voltage detector. In other embodiments, however, the detection circuit may be coupled to detect a DC voltage input to the PFC system 300. For example, the detection circuit may be a DC voltage detection circuit coupled across the capacitor C1 to detect the magnitude of the DC voltage input to the PFC system 300. When the detection circuit detects the magnitude of the input voltage exceeds the threshold voltage, the controller disables the second power rail, e.g., by not generating the second control signal.

The inductance of the inductor L1 may be the same or different from the inductance of the inductor L2. When the inductances of the inductors L1, L2 are the same, the first and second power rails will each carry about the same amount of current when both of the first and second power rails are operating. When the inductances of the first and second inductors L1, L2 are different and both power rails are operating, the power rail with the inductor having the lower inductance will carry more current than the power rail with the inductor having the higher inductance. Thus, in some embodiments, the inductor L2 has an inductance that is lower than the inductance of the inductor L1. Accordingly, in such embodiments, when the first and second power rails are operating, the second power rail will carry more current than the first power rail. In one example, the inductance of the inductor L2 is about half the inductance of the inductor L1. In such an example, the second power rail will carry about twice the current of the first power rail.

In embodiments in which the inductances of the inductors L1, L2 are the same, the first and second control signals may have the same duty cycle. Thus, the first and second power rails will each carry about half of the current provided by the PFC system 300. The first and second control signals may be in phase with each other or there may be a phase difference between the first control signal and the second control signal. By introducing a phase difference between the first and second control signals output current ripple may be reduced, electromagnetic interference may be reduced, and/or a smaller input filter may be needed in the PFC system 300. The phase difference may be any suitable phase difference. In one example embodiment, the phase difference is about one hundred and eighty degrees.

Figure 5:
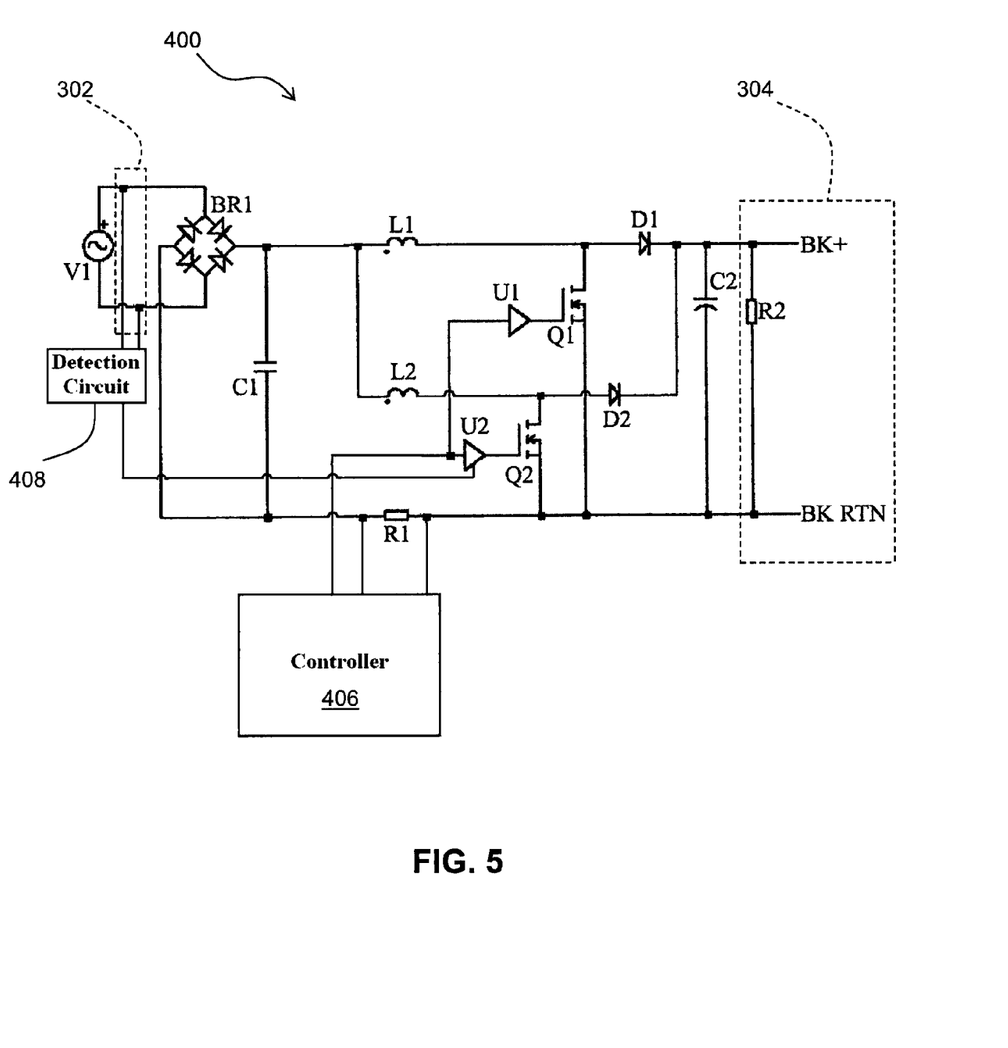
FIG. 5 is a circuit diagram of yet another example power factor correction system including two power rails and a controller for providing a control signal to the two power rails.

Another example embodiment of a power factor correction (PFC) system 400 is shown in FIG. 5. Except as described below, the PFC system 400 is similar to the PFC systems 200, 300 and operates in a manner similar to the PFC systems 200, 300.

The PFC system 400 includes a controller 406 coupled to the first rail and the second rail. The controller 406 is configured to generate a control signal for controlling the switches Q1, Q2 to produce the output voltage. The PFC system 400 includes a detection circuit 408 coupled to the input and the second power rail. The detection circuit 408 is configured to detect a magnitude of the input voltage and to prevent the second switch from switching in response to the control signal when the magnitude of the input voltage exceeds a threshold voltage.

Controller 406 is configured to generate a control signal to control the switches Q1, Q2 to produce the output voltage. The driver U1 is coupled between the controller 406 and the switch Q1 and a driver U2 is coupled between the controller 406 and the switch Q2. The controller provides a control signal to the drivers U1, U2, which then drive switching of the switches Q1, Q2 in response to the control signal.

When the detection circuit 408 detects the magnitude of the input voltage exceeds the threshold voltage, the detection circuit 408 (or the controller containing the detection circuit as applicable), prevents the switch Q2 from being switched in response to the control signal. This may be accomplished by any suitable means including, for example, disabling the driver U2. If the driver U2 is disabled, switch Q2 will not receive the control signal and, accordingly, the second power rail will not operate to provide the output voltage.

The detection circuit 408 is shown in FIG. 5 as separate from the controller 406, but may be considered a part of the controller 406 or, in some embodiments, may actually be part of the controller 406.

According to another aspect of the present disclosure, it is also possible to use more than two power rails, all equal or unequal in size and enable or disable them according to the line and load conditions.

Simulation results of converters designed in accordance with the present disclosure show that the efficiency of the boost front end at high line voltage can be as high as a quasi-bridgeless boost converter which uses two input AC rectifier diodes but it is achieved at a much lower cost.

The system in accordance with the present disclosure can be used in other variants of active power factor correction circuits including continuous current mode boost PFC, discontinuous current mode boost PFC, boundary mode conduction PFC, multi phase PFC boost converters, buck-boost PFC and buck mode PFC.

Although the system in accordance with the present disclosure has been described herein above with reference to a boost converter system, it can be used for any application that operates at two widely separated input voltages.

A power factor correction system as described in this disclosure has several technical advantages including but not limited to the realization of:
- a power factor correction system for devices operating at two widely separated input voltages;
- a cost effective solution for devices operating at two widely separated input voltages;
- a power factor correction system that has a high efficiency at both high line and low line voltages;
- a power factor correction system that improves the power factor at high line voltage and light loads;
- a power factor correction system that has a high efficiency at high line voltage and light loads;
- a power factor correction system that is compact; and
- a power factor correction system that has very simple control means.

Furthermore, present invention can also be used for DC input systems having very wide input range. One such example is the DC to DC converters used in telecommunications which need to operate over input voltage range of 36VDC to 72VDC.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A power factor correction system (PFC) for generating an output voltage from an input voltage, the PFC system comprising:
   an input for receiving the input voltage;
   an output for outputting the output voltage;
   a first power rail coupled to the input and the output to receive the input voltage and generate the output voltage, the first power rail including a first switch and a first inductor having a first inductance value;
   a second power rail coupled to the input and the output, the second power rail selectively operable to generate the output voltage, the second power rail including a second switch and a second inductor having a second inductance value;
   a controller coupled to the input, the controller configured to detect a magnitude of the input voltage, to generate a first control signal to control switching of the first switch, to generate a second control signal to control switching of the second switch when the magnitude of the input voltage is less than or equal to a nonzero threshold value, and to not generate the second control signal when the magnitude of the input voltage exceeds the threshold voltage.

2. The PFC system of claim 1 wherein the controller is configured to generate the first control signal and the second control signal with a phase difference between the first control signal and the second control signal greater than zero degrees.

3. The PFC system of claim 2 wherein the phase difference is about one hundred and eighty degrees.

4. The PFC system of claim 2 wherein the first inductance value is about equal to the second inductance value.

5. The PFC system of claim 2 wherein the first power rail and the second power rail are substantially identical.

6. The PFC system of claim 1 wherein the threshold voltage has a first value when the first and second control signals are being generated and a second value when the second control signal is not being generated.

7. The PFC system of claim 6 wherein the first value is greater than the second value.

8. A power factor correction system (PFC) for generating an output voltage from an input voltage, the PFC system comprising:
   an input for receiving the input voltage;
   an output for outputting the output voltage;
   a first power rail coupled to the input and the output to receive the input voltage and generate the output voltage, the first power rail including a first switch and a first inductor;
   a second power rail coupled to the input and the output, the second power rail selectively operable to generate the output voltage, the second power rail including a second switch and a second inductor;
   a controller coupled to the input, the controller configured to detect a magnitude of the input voltage, to operate the first power rail to produce the output voltage, to operate the second power rail to produce the output voltage when the magnitude of the input voltage is less than or equal to a nonzero threshold value, to operate the first power rail and the second power rail with a phase difference between them of greater than zero degrees when the magnitude of the input voltage is less than or equal to the threshold value, and to not operate the second power rail when the magnitude of the input voltage exceeds the threshold voltage.

9. The PFC system of claim 8 wherein the phase difference is about one hundred and eighty degrees.

10. The PFC system of claim 8 wherein the first inductance value is about equal to the second inductance value.

11. The PFC system of claim 8 wherein the first power rail and the second power rail are substantially identical.

12. The PFC system of claim 8 wherein the threshold voltage has a first value when the first and second power rails are being operated and a second value when the second power rail is not being operated.

13. The PFC system of claim 12 wherein the first value is greater than the second value.

14. A method of generating an output voltage from an input voltage with a power factor correction system (PFC) including a first power rail, a second power rail, and a controller, the first and second power rails coupled between an input and an output to receive the input voltage and generate the output voltage, the controller configured to selectively operate the first and second power rails to generate the output voltage, the method comprising:

operating the first power rail to produce the output voltage;

operating the second power rail with a phase difference relative to the first power rail greater than zero degrees to produce the output voltage when a magnitude of the input voltage is less than or equal to a nonzero threshold value; and     not operating the second power rail when the magnitude of the input voltage exceeds the threshold voltage.

15. The method of claim 14 wherein the phase difference is about one hundred and eighty degrees.

16. The method of claim 14 wherein the first power rail and the second power rail are substantially identical.

17. The method of claim 14 wherein the threshold voltage has a first value when the first and second power rails are being operated and a second value when the second power rail is not being operated.

18. The method of claim 17 wherein the first value is greater than the second value.

\* \* \* \* \*